Aug. 15, 1950     R LEE     2,518,479
DYNAMOELECTRIC MACHINE
Filed Dec. 16, 1946     2 Sheets-Sheet 1
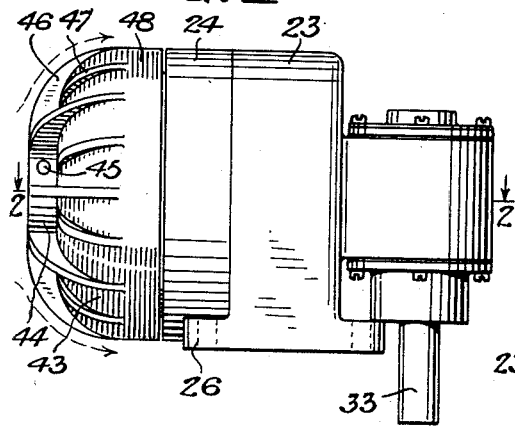
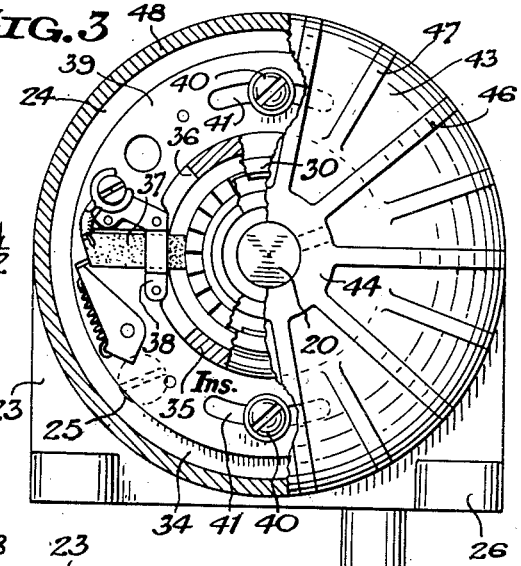
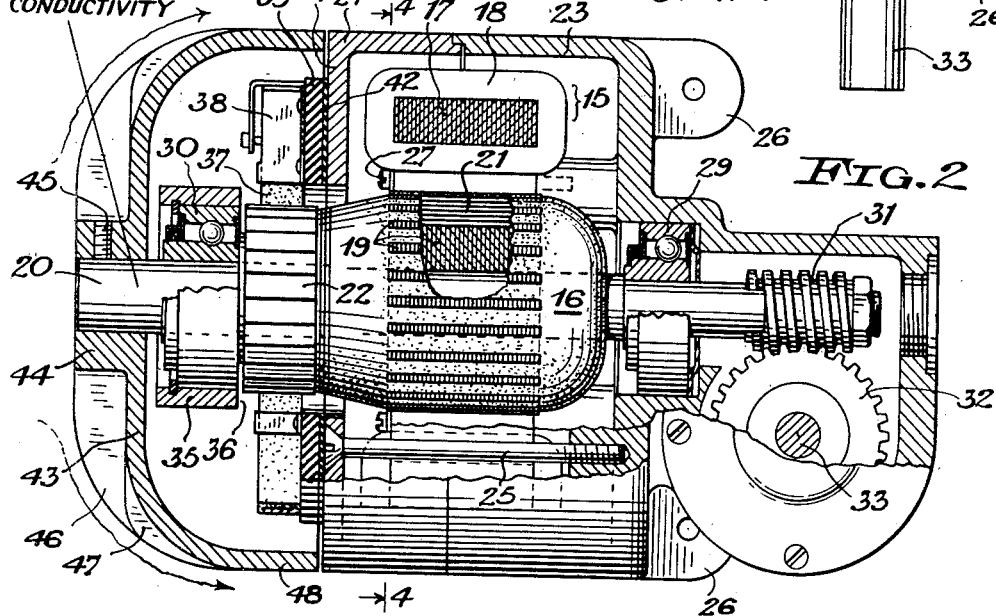
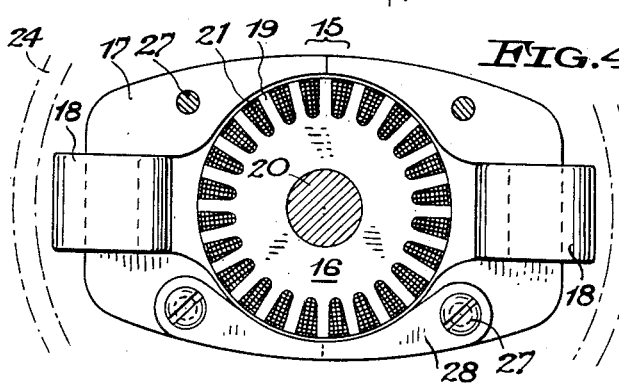
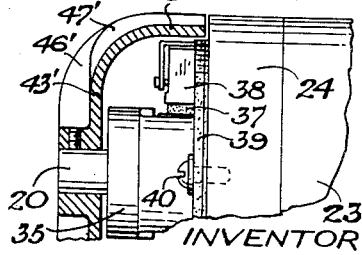
INVENTOR
ROYAL LEE
BY Christopher L. Waal
ATTORNEY Aug. 15, 1950            R. LEE            2,518,479
DYNAMOELECTRIC MACHINE
Filed Dec. 16, 1946            2 Sheets-Sheet 2
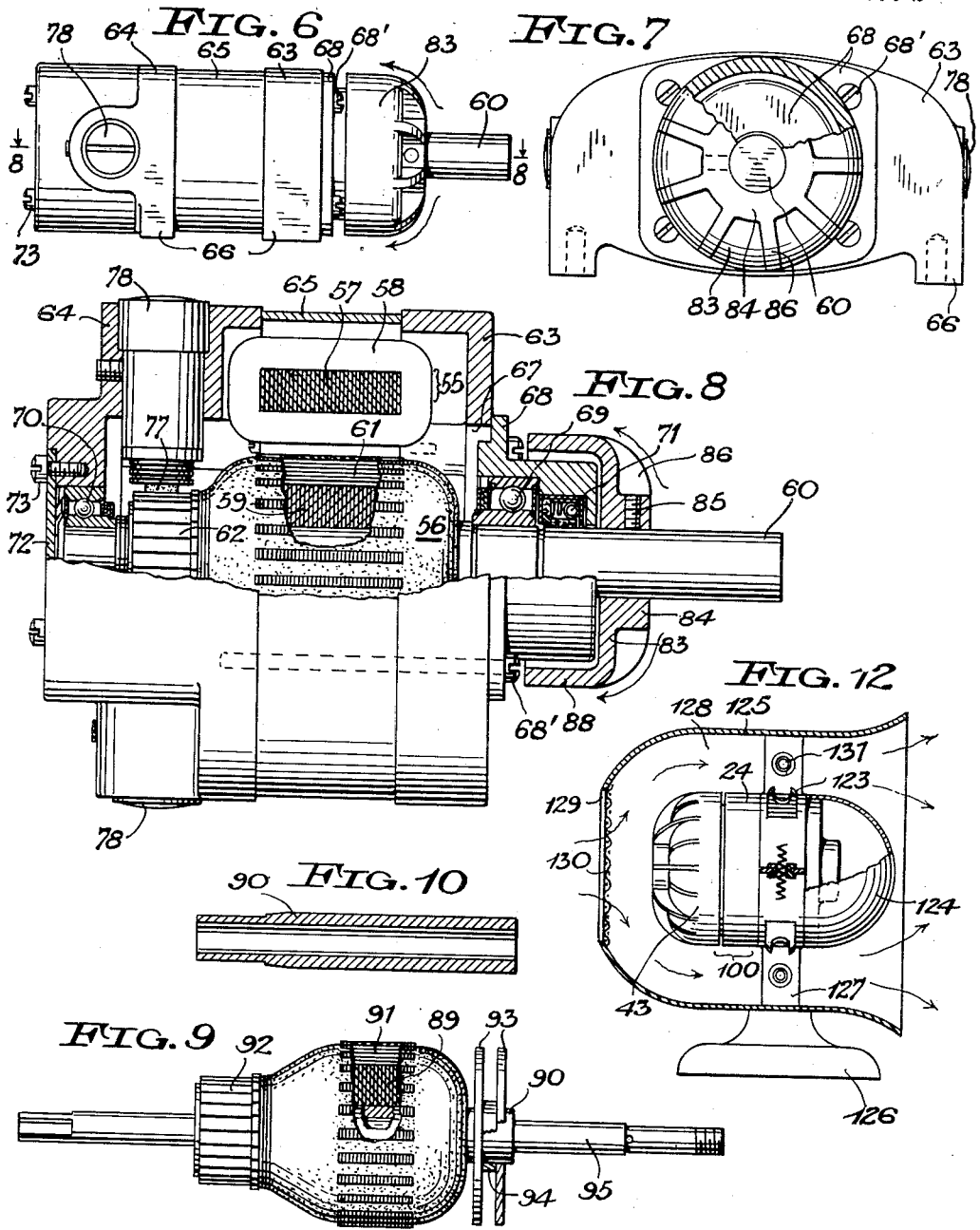
INVENTOR
ROYAL LEE
ATTORNEY Patented Aug. 15, 1950

2,518,479

UNITED STATES PATENT OFFICE 2,518,479

DYNAMOELECTRIC MACHINE

Royal Lee, Elm Grove, Wis., assignor to Lee Engineering Company, Milwaukee, Wis., a corporation of Wisconsin Application December 16, 1946, Serial No. 716,637

4 Claims. (Cl. 172—36)

The present invention relates to dynamoelectric machines and is particularly applicable to small machines such as motors of fractional horsepower.

An object of the invention is to provide an electric motor construction having improved armature cooling means which shall afford a substantial increase in the power rating of a fractional horsepower motor of a given size and shall also enhance the efficiency.

Another object is to provide an electric motor in which armature heat is effectively removed by conduction through a shaft of high thermal conductivity, desirably to a region exterior to the motor, permitting more or less complete enclosure of the motor without interfering with adequate cooling.

Still another object is to provide a motor having an improved form of heat-dissipating fan.

A further object is to provide a motor in which the fan serves to enclose the brush rigging.

A still further object is to provide a fractional horsepower electric motor having an armature which shall facilitate the mounting of different shafts.

The invention further consists in the several features hereinafter described and claimed.

In the accompanying drawings, illustrating certain embodiment of the invention,

Fig. 1 is a side elevational view of an electric motor constructed in accordance with the invention;

Fig. 2 is a longitudinal sectional view of the motor, taken generally along the line 2—2 of Fig. 1;

Fig. 3 is an end elevational view, parts being broken away and parts being shown in section;

Fig. 4 is a detail transverse sectional elevational view, taken generally along the line 4—4 of Fig. 2;

Fig. 5 is a fragmentary detail view, similar to Fig. 2, showing a modified form of motor;

Fig. 6 is a side elevational view of another modified form of motor;

Fig. 7 is an end elevational view of the motor of Fig. 6, parts being broken away and parts being shown in section;

Fig. 8 is a longitudinal sectional view taken generally along the line 8—8 of Fig. 6;

Fig. 9 is a side elevational view of a modified form of armature, parts being broken away and parts being shown in section;

Fig. 10 is a longitudinal sectional view of a core-supporting sleeve for the armature of Fig. 9;

Fig. 11 is a side view of a shaft member for the armature of Fig. 9, and

Fig. 12 is a longitudinal sectional elevational view of a motor-driven desk fan incorporating features of the invention.

In that form of the invention shown in Figs. 1 to 4, the numerals 15 and 16 respectively designate the stator and rotor elements of a bipolar electric motor of fractional horsepower rating. The stator element may be of any suitable type and is here shown to comprise a laminated stator core 17 of the split or divided pole type having field coils 18. The rotor element or armature has a toothed core formed by a stack of centrally apertured laminations 19 which are pressed onto a shaft 20 formed of a metal of high thermal conductivity, such as a suitable heat-treated aluminum alloy, examples of which are Duralumin and 75ST (Aluminum Company of America). The latter alloy is preferred as it has strength and hardness characteristics approximating those of cold-rolled steel. The thermal conductivity of the above alloys is substantially higher than that of iron and steel, being approximately three times as high as that of cold-rolled steel. Furthermore, these light-weight, non-magnetic alloys minimize heating of the shaft by magnetic flux variations and make possible the use of a shaft of relatively large diameter. The toothed armature core 19 carries a winding 21 which is disposed in the core slots and is connected to a commutator 22 mounted on the shaft. The machine is preferably arranged as a series or universal motor, although shunt, repulsion and other types may be provided.

The stator 15 is secured in a casing or housing comprising complementary cup-shaped members 23 and 24 rigidly clamped together, as by screws 25, the casing members being preferably formed of aluminum castings. The casing member 24 is of cylindrical shape and the casing member 23 has mounting feet 26. The stator core is secured to the casing member 23, as by screws 27 of good thermal conductivity, such as the 75ST alloy above mentioned, these screws serving to conduct heat from the stator to the heat-dissipating casing member 23. In some instances, the two complementary stator core sections may be connected by bridging straps 28, one being shown in Fig. 4, secured in place by the screws 27.

The casing members 23 and 24 are provided with respective ball bearings 29 and 30 in which the armature shaft 20 is journalled. For certain applications the motor embodies a reduction drive, here shown to comprise a worm 31 on the armature shaft meshing with a worm wheel 32 secured to a vertical output shaft 33 journalled in the casing member 23. The casing member 24 has a flat wall 34 extending perpendicular to the armature shaft and provided with a tubular extension 35 in the outer end of which the ball bearing 30 is mounted. The tubular extension has opposite openings 36 to admit spring-pressed brushes 37 which bear on the commutator 22. The brushes are carried in holders 38 which are mounted on a flat insulating ring 39 rotatably mounted on the tubular casing extension 35 and clamped in augularly adjusted position to the flat casing wall 34 by screws 40 passing through slots 41 in the ring. A flat insulating sheet 42 is interposed between the ring 40 and the casing wall 35.

The armature shaft 20 projects from the casing extension 35 and has detachably secured thereto a cup-shaped or bowl-shaped heat-dissipating fan 43 formed of a metal of good heat conductivity, such as cast aluminum. The fan has a hub 44 firmly fastened to the shaft as by a screw 45 and has radiating ribs or fins 46 and 47 on its outer surface. The bowl-shaped fan surrounds the casing extension 35 and the brush rigging and has a continuous cylindrical outer portion 48 of substantially the same diameter as the casing member 24, the edge of the cylindrical portion of the fan being adjacent to the flat casing wall 34. The brush rigging and commutator are thus enclosed and protected by the bowl-shaped fan.

In the operation of the motor, heat developed in the armature, representing a large part of the motor heat loss, is conducted inwardly by the armature laminations to the shaft 20, which is in contact with the inner edges of these laminations, thence longitudinally of the shaft to the ribbed, bowl-shaped fan 43, and outwardly of the fan, being dissipated in the surrounding air by the fan. The temperature rise of the motor is thus effectively limited. The air currents produced by the fan flow in a more or less axial course at the periphery of the fan and sweep over the casing, thus also cooling the motor casing. The relatively high thermal conductivity of the shaft 20 results in effective cooling of the armature, even though the armature is fully enclosed. For a motor of a given size and speed the cooling means of the invention will make it possible to increase the useful motor output very substantially, and the motor efficiency will also be materially improved. In the case of a small motor having an armature of 1½" diameter it has been found that the power output can be approximately doubled by the use of the cooling means of the invention.

The modified form of motor shown in Fig. 5 has a bowl-shaped cooling fan 43' on which the radial ribs 46' and 47' are extended along the cylindrical periphery 48' of the fan to the rim or edge of the fan, thus providing adequate cooling at a lower motor speed or providing greater air movement at a higher speed when this action is desired. The motor of Fig. 5 is otherwise the same as that of Fig. 2.

The modified form of electric motor shown in Figs. 6 to 8 is wholly enclosed and suitable for use in an atmosphere of oily or inflammable vapor. The motor has a wound stator element 55 which is similar to that of Figs. 2 and 4, and a cooperating rotor element or armature 56 which is similar to that of Figs. 2 and 4. The stator element has a laminated core 57 carrying field coils 58. The armature has a toothed laminated core 59 which is pressed onto a metal shaft 60 of high thermal conductivity, as in the motor of Fig. 2, and has a winding 61 connected to a commutator 62. The stator 55 is secured in a casing or housing comprising casing members 63 and 64 and an intervening shell 65, all of elliptical shape, the members 63 and 64 having mounting feet 66. The casing member 63 has a large central opening 67 which is closed by a flanged cup-shaped bearing holder 68 secured in place by long screws 68' threaded into the casing member 64, thus securing the casing members together. The stator core 57 is secure to the casing member 63 in the same manner as the stator core 17, and if desired may be clamped between the casing members 63 and 64. The bearing holder 68 and the casing member 64 carry respective ball bearings 69 and 70 in which the armature shaft 60 is journalled. The bearing holder 68 also carries a suitable shaft seal 71, and the casing member 64 is closed by a central cover plate 72 secured by screws 73. Brushes 77 bear on the commutator 62 and are carried by brush holders 78 mounted in the casing member 64.

The armature shaft 60 projects through the bearing holder 68 and has mounted thereon a cup-shaped or bowl-shaped heat-dissipating fan 83 formed of a metal of good thermal conductivity such as aluminum. The fan has a central hub 84 secured to the shaft, as by a screw 85, and has radiating ribs 86 which extend to a cylindrical peripheral portion 88 of the fan, the latter portion surrounding the bearing holder 68.

The operation of the motor of Figs. 6 to 8 is similar to the motor of Figs. 1 to 4. During operation, heat developed in the armature flows longitudinally through the aluminum alloy shaft 60 and is dissipated by the fan 83, thus effectively cooling the armature to limit the temperature rise thereof, so as to permit the motor to deliver a relatively large useful power output and to improve motor efficiency. The construction of the motor permits adequate cooling even though the motor is completely enclosed.

The armature shown in Figs. 9 to 11 comprises a core 89 formed of a stack of centrally apertured toothed laminations, like those of Figs. 2 and 4, pressed onto a shaft-forming sleeve 90 formed of a metal of good thermal conductivity, like that used for the shaft 20 of Fig. 2. The armature carries a winding 91 connected to a commutator 92 mounted on an end portion of the sleeve. The other end of the sleeve projects from the armature body and has mounted thereon, as by a press fit, one or more cooling disks or washers 93 formed of a metal of good thermal conductivity, such as aluminum or a suitable aluminum alloy. Two disks are shown and are spaced by a metal ring 94 pressed onto the sleeve, the ring being formed of a metal of good heat conductivity. In some instances the disks may be replaced by a fan of any conventional shape formed of similar metal. By employing suitable armature laminations, such as those shown in Fig. 4, ample magnetic material will be present between the sleeve and bottoms of the winding slots.

An armature shaft 95, which may be formed of steel or other suitable metal, is pressed into the sleeve to project therefrom at opposite ends, the shaft having longitudinal fins or ridges 96 to lock the shaft to the sleeve. The shaft may be of various shapes and lengths to suit the requirements of particular motors. By way of example, it may be desired to provide a ¼" diameter shaft for a 1½" diameter armature. The sleeve 90 being of considerably larger diameter than the shaft 95, provides ample cross-sectional area for efficient heat conduction. The armature is mounted to rotate in any suitable field structure, which may be like that of Fig. 2.

In the operation of a motor equipped with the armature of Fig. 9, heat developed in the armature flows longitudinally through the metal sleeve 90 and is dissipated by the disks 93, as in the motor of Fig. 2 or Fig. 8, except that the disks are usually within the motor casing. The cooling disks provide good heat dissipation with very little drag on the motor, permitting high speed operation.

The armature unit comprising the sleeve 90 and the wound core 89 and the other parts mounted on the sleeve can be completely finished before the shaft 95 is applied, and in some instances the armature unit may also omit the heat-dissipating disks or the fan, as these are readily applied at a later stage. This construction facilitates the keeping of a stock of armatures by manufacturers and dealers, as shafts of various shapes and lengths can be easily and quickly applied to standard armature units to suit the requirements of customers.

In the form of the invention shown in Fig. 12, the invention is embodied in a desk fan device. The device includes a motor 100 which is generally similar to that of Fig. 1, the motor casing including complementary cylindrical casing members 24 and 123, and a rotatable motor-cooling fan 43 being mounted at the rear of the casing member 24 as in the motor of Fig. 1 or Fig. 5. A hemispherical shell 124 is coaxially secured to the front of the casing member 123. An annular cowl or housing 125 carried on a base 126 coaxially surrounds the motor and is secured to radial arms 127 projecting from the casing member 123 so as to form an annular passage 128 between the motor and the cowl. The front end of the cowl may be flared and the rear end is reduced and has a circular inlet opening 129 with a screen 130 which guards the fan. In some instances an electric heating element 131 is arranged in the annular air passage 128, and is supported on the arms 127.

In the operation of the desk fan device, air is drawn through the rear opening 129 by the fan 43 and is urged forwardly through the annular passage 128, being discharged and diffused at the front of the cowl.

The fan 43 is of relatively small diameter, approximately that of the motor casing, and can be quietly and efficiently driven at a high speed of 5,000 to 10,000 R. P. M., which is an efficient speed for a small series-type motor.

While the invention is shown to be embodied in small motors it is also applicable to small generators.

What I claim as new and desire to secure by Letters Patent is:

1. In a dynamo-electric machine having a frame and a rotatable armature with a centrally apertured laminated core and a commutator, a shaft formed of a metal of good thermal conductivity substantially higher than that of iron and tightly fitting in said core to conduct heat from said core, brush rigging for said commutator mounted on said frame, and a cup-shaped, metal heat-dissipating member secured to an end portion of said shaft and forming an enclosure surrounding and concealing said brush rigging.

2. In a dynamo-electric machine having a cylindrical frame and a rotatable armature with a centrally apertured laminated core and a commutator, a shaft formed of a metal of good thermal conductivity substantially higher than that of iron and tightly fitting in said core to conduct heat from said core, said frame having a disk-like wall with a projecting reduced end portion in which an end portion of said shaft is journalled, brush rigging for said commutator mounted on the outside of said wall, and a cup-shaped metal, heat-dissipating member secured to said shaft end portion and forming an enclosure surrounding and concealing said frame end portion and said brush rigging, the rim portion of said cup-shaped member being adjacent to the periphery of said disk-like wall.

3. In a dynamo-electric machine having a casing of substantially circular periphery and having an armature therein with a centrally apertured laminated core, a shaft of good thermal conductivity substantially higher than that of iron and tightly fitting in said core to conduct heat therefrom, and an externally ribbed cup-shaped, heat-dissipating fan secured to said shaft and disposed exteriorly of said casing and adjacent to said casing, said fan being of approximately the same diameter as said casing and having a continuous rim adjacent to said casing.

4. In a dynamo-electric machine having a casing and a rotatable armature with a shaft, a cup-shaped fan secured to an end of said shaft, and a cowl open at opposite ends and surrounding said casing to form an annular air passage through which air is forced in a generally axial direction by said fan.

ROYAL LEE.

REFERENCES CITED

The following references are of record in the file of this patent:

UNITED STATES PATENTS

| Number | Name | Date |
|---|---|---|
| 1,190,054 | Wiard | July 4, 1916 |
| 1,860,068 | Bassler | May 24, 1932 |
| 1,892,997 | Oldenburg | Jan. 3, 1933 |
| 1,909,395 | Egli | May 16, 1933 |
| 1,934,981 | Johnson | Nov. 14, 1933 |
| 2,330,121 | Heintz | Sept. 21, 1943 |

OTHER REFERENCES

Standard Handbook for Electrical Engineers—Knowlton, by McGraw-Hill, page 442, Table 782.